United States Patent [19]

Osdor

[11] 3,946,495

[45] Mar. 30, 1976

[54] METHOD AND APPARATUS FOR DRYING MOISTURE-CONTAINING SOLIDS PARTICULARLY DOMESTIC REFUSE AND SLUDGE CAKES

[76] Inventor: Asriel Osdor, 36 Tzirelson St., Tel Aviv, Israel

[22] Filed: Dec. 19, 1973

[21] Appl. No.: 426,247

[52] U.S. Cl. ........................... 34/15; 34/27; 34/28; 34/35; 34/73; 34/166; 34/169; 34/182
[51] Int. Cl.² .......................................... F26B 5/04
[58] Field of Search ........................... 34/15, 25–28, 34/33, 36, 37, 51, 166, 169, 174, 181, 182, 72, 73, 75, 196; 60/648, 646; 122/477

[56] References Cited
UNITED STATES PATENTS

| | | | |
|---|---|---|---|
| 1,408,456 | 3/1922 | Harrison | 34/169 |
| 1,975,268 | 10/1934 | Grady | 122/477 |
| 2,062,025 | 11/1936 | Harrington | 110/15 |
| 2,254,867 | 9/1941 | Bonotto | 34/28 |
| 3,205,664 | 9/1965 | Nettel | 60/646 |
| 3,325,912 | 6/1967 | Bojner et al. | 34/169 |
| 3,438,202 | 4/1969 | Roe | 60/648 |
| 3,564,723 | 2/1971 | Passey et al. | 34/169 |

*Primary Examiner*—Carroll B. Dority, Jr.
*Assistant Examiner*—Larry I. Schwartz
*Attorney, Agent, or Firm*—Benjamin J. Barish

[57] ABSTRACT

Method and apparatus are described for the production of solid fuel and steam by drying moisture-containing solids, such as refuse and sludge cakes, in a multi-stage heating zone by using the moisture-containing solids as the feed-water in a direct contact countercurrent flow pressurized boiler. After vaporizing the bulk of the moisture in the heating zone of the boiler, the solid residue is further dried in a multi-stage flashing zone. From the upper end of the heating zone is removed a nearly saturated steam including the water vapor evaporated from the moisture-contained solids by the heat of cooling of the introduced superheated steam. A portion of the removed steam equal to the vaporized moisture is heated and then directed to a turbine, generating all the power required to operate the system. The bulk of the removed steam equal to the introduced superheated steam is compressed, reheated and recycled through the heating zone. The dried solid is removed at the lower end of the flashing zone and is incinerated, and the recovered heat is utilized to supply the heat required for said drying, and to produce saturated steam for heating purposes, or superheated steam for power generation.

In the latter case the heat of condensation of the turbine exhaust steam is utilized advantageously as a heat source in a distillation plant for fresh water production.

23 Claims, 8 Drawing Figures

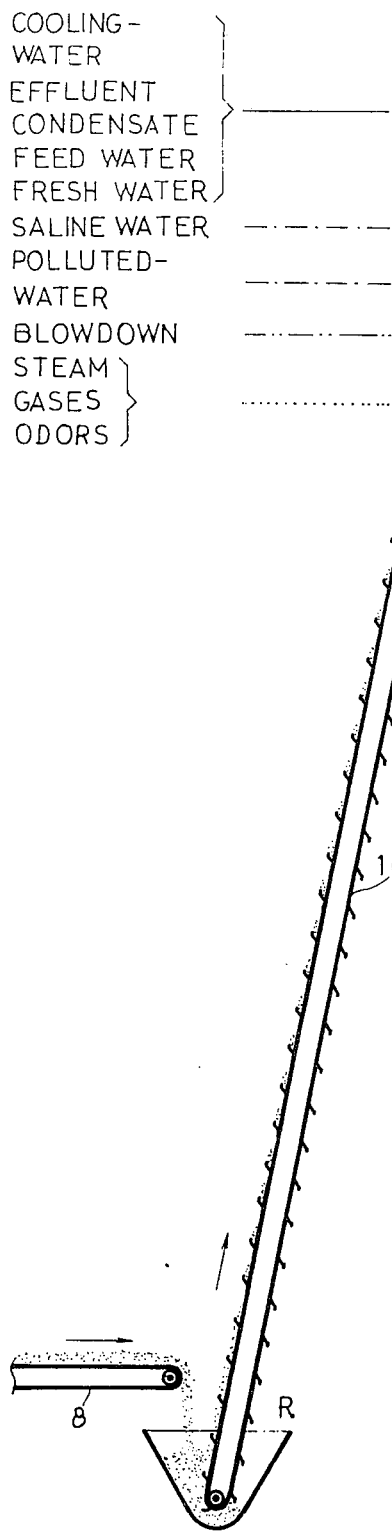
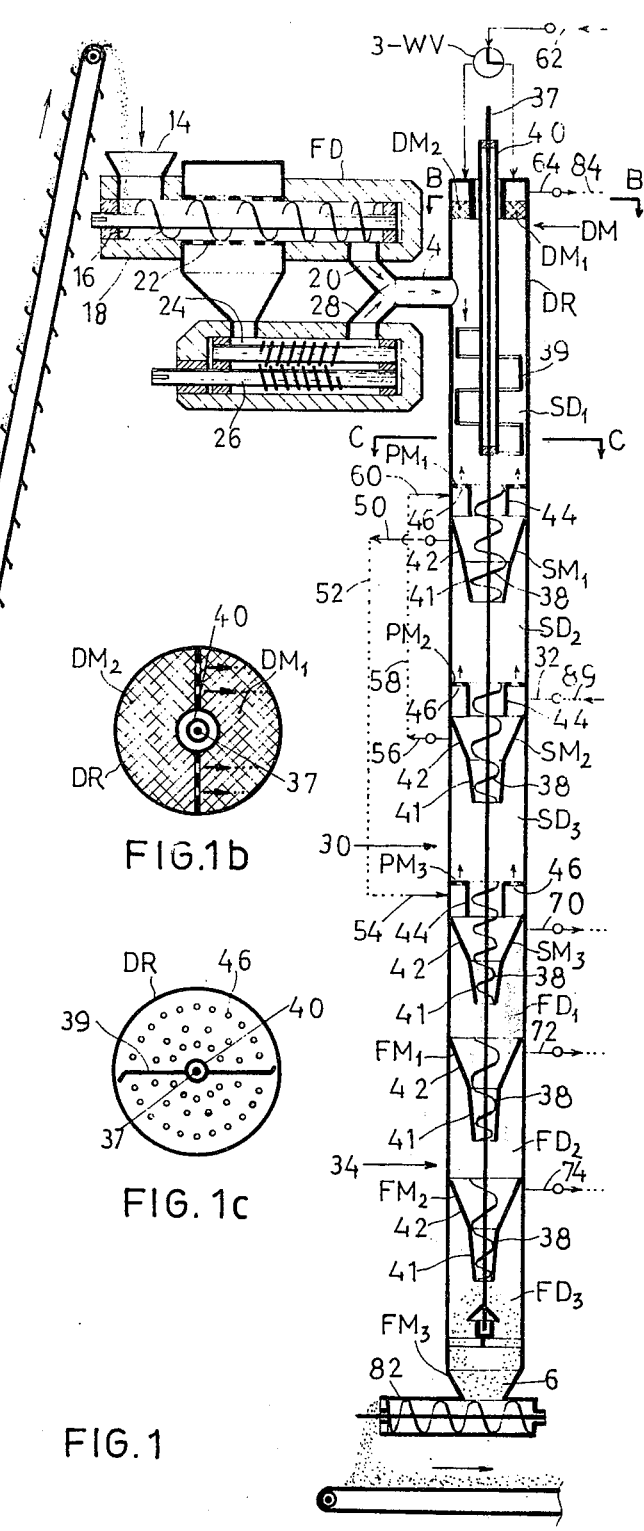
FIG. 1b
FIG. 1c
FIG. 1

METHOD AND APPARATUS FOR DRYING MOISTURE-CONTAINING SOLIDS PARTICULARLY DOMESTIC REFUSE AND SLUDGE CAKES

BACKGROUND OF THE INVENTION

The present invention relates to a method and apparatus for drying moisture-containing solids, such as domestic refuse and sludge cakes.

The invention is particularly useful, and is therefore described below, with respect to multi-purpose plants for processing domestic refuse and sludge cakes for some or all of the following purposes: (1) the disposal of the refuse and sludge cakes by incineration with efficient heat recovery and with non-polluting flue gases being discharged into the atmosphere; (2) the production of dried solid fuel and steam; (3) the utilization of a portion of the recovered heat to supply all the heat requirements for the drying operation, and for superheating the vaporized moisture to be used for the generation of all the power requirements of the plant; (4) the utilization of the remaining recovered heat to produce superheated steam for power generation or saturated steam for heating or other purposes; and (5) the production of fresh water by distillation from sea water, brackish water, polluted river water, or waste water, in a dual-purpose plant, where said superheated vaporized moisture (item 3) and said superheated steam (item 4), after being used for power generation, are further utilized to supply their heat of condensation for said fresh water production.

At the present time, disposing domestic refuse and sludge cakes is a very expensive operation. One method for disposing such refuse is by incineration, but refuse containing more than 50% moisture cannot be incinerated with the existing incinerators without auxiliary heating, especially if deodorized and non-polluted flue gases are to be discharged into the atmosphere. For example, in Paris, incinerators are supplied with 15 kg of fuel per ton of refuse for each 5% moisture content above 50%, as noted for example in the book "Les Residus Menagers", page 43 by Andre Saurin, 1967 (as well as other references mentioned below).

In the presently used methods of refuse and sludge cake incineration, the heat used to vaporize the moisture is generally a total loss because the produced water vapor is mixed with the drying hot gases. Furthermore, moisture reduces the flame temperature and increases the burning time, as the presence of the evaporated moisture increases the gas volume and thus reduces the concentration of the fuel and air in the burning mixture.

Thus, in the presently used methods the incinerator capacity and overall efficiency are considerably reduced by the moisture contained in the incinerated matter; also, the drying of the refuse or sludge cakes by direct contact heating with the combustion heating gases results in pollution of the overflowing cooled flue gases.

The present invention provides a method and apparatus having advantages in the above respects for drying moisture-containing solids, particularly domestic refuse and sludge cakes.

Very important and substantial advantages are provided when the invention is used for processing refuse and sludge cakes. Compare it for example with the method of disposing the Paris refuse in the manner described in the above-cited publication. According to that publication (page 43), the steam production for heating is 0.90 to 1.30 tons steam per ton of incinerated refuse, and the net average power production is 150 kWh per ton incinerated refuse. The average moisture content of Paris refuse is 30% (page 6 of the publication), so that the average power production and the average steam production for heating per ton of dry refuse are respectively, 150/0.70, or 214 kWh, and (0.90 + 1.30)/2 × 0.70, or 1.6 tons steam.

In sharp contrast to these figures, the present invention enables (as will be shown by Table I, item 12, and Table II, item 10, below) a power production of 640 kWh net and a steam production of 4.1 tons steam net, per ton of dry refuse. This result is obtained by drying and incinerating a refuse containing 60% moisture whereas with the existing incinerators, not only there is not produced any heat and power excess, but auxiliary heating is required.

This comparison to the prior art indicates that the present invention is a definite break-through in this field.

COMPOSITION AND CALORIFIC VALUE OF REFUSE

The invention is described herein particularly with respect to a method and apparatus for drying domestic refuse and sludge cakes, this being a preferred application, although not an exclusive one. Before proceeding with the description of the actual method and apparatus, it might be helpful to first provide some data concerning the moisture-content and calorific value of domestic refuse.

In "1968 National Incineration Conference" published by the "American Society of Mechanical Engineering", New York (Paper presented by H. Eberhardt and W. Mayor) page 78 it is said: "In Central Europe a lower heating value of 800–2500 kcal/kg is demanded for refuse by consumer. Variations in moisture content of up to a maximum of 50 percent and in the ash content of up to a maximum of 60 percent and in the combustibles of at least 25 percent, for example, are agreed upon for the incineration of refuse without auxiliary heating".

In a Paper presented by G. Stabenow in the same publication (page 287), the following data are given with respect to an overall thermal efficiency of the stoker-boiler unit:

|  | (1) | (2) | (3) |
| --- | --- | --- | --- |
| Gross calorific value, Btu/lb | 5000 | 6000 | 6500 |
| Ash content % | 24 | 14 | 10 |
| Moisture % | 21 | 20 | 19 |
| Combustibles % | 55 | 66 | 71 |
| Overall thermal efficiency % | 65.0 | 66.0 | 66.5 |
| Specific steaming rate lb steam per lb refuse burned | 3.3 | 4.1 | 4.4 |

The composition of the refuse given in this table, especially in column (1), is very near the composition of the average Unites States refuse, which is:

| | |
|---|---|
| noncombustible | 24.9 % |
| moisture | 20.7 % |
| combustibles | 54.4 % |
| | 100.0 % |

But the United States refuse composition is totally different from the composition of the refuse in all other parts of the World, because in the United States the percentage of paper in the refuse is very high (42%).

The moisture content of refuse in other localities is estimated as follows:
Paris refuse (mean 30%) up to 55% and more
Central Europe refuse up to 60% and more
Tokyo refuse up to 70%
Tel Aviv refuse (mean in winter) 67%

According to the above reference, a refuse containing more than 50% of moisture cannot be incinerated without auxiliary heating with the existing incinerators especially if deodorized and non-polluent flue gases are to be discharged to the atmosphere. As mentioned earlier, in Paris incinerators are supplied with 15 Kg of fuel per ton of refuse for each 5% moisture above 50%.

If the column (1) composition is taken as an example and its moisture content is increased from 21 to 60%, the new composition is:

| | |
|---|---|
| ash content % | 12 |
| moisture % | 60 |
| combustible % | 28 |
| | 100 |

The present invention provides a method and apparatus which efficiently reduces the moisture-content of the refuse (e.g. to about 5%, and even less), producing a valuable solid fuel. In addition, the moisture originally contained in the solids is obtained in the form of steam and can be utilized as nearly saturated steam for heating, or as superheated steam for power generation.

For example, when one kilogram of refuse containing 60% moisture is dried to a 5% moisture content, there will be obtained 0.421 kg dried refuse at 5% moisture, and there will be vaporized 0.579 kg of moisture.

To obtain one kg of such dried refuse there will be vaporized 0.579/0.421 = 1.375 kg moisture from 2.375 kg of the wet refuse.

The composition of this dried refuse is:

| | |
|---|---|
| Ash content | 28.5 % |
| Moisture | 5.0 % |
| Combustible | 66.5 % |

The gross calorific value in the above column (1) is 5000 Btu/lb, or 2800 kcal/kg of raw refuse, or 2800/0.79 = 3530 kcal/kg dry solids (or 5000/0.79 = 6330 Btu/lb dry solids).

The overall boiler efficiency of a steam-generating unit (including furnace, boiler, superheater, economizer, air heater, combustion gases cleaner and the dryer) using as fuel the produced dried refuse at 5% moisture content, is at least 65% of the gross heat value of the dry refuse. Based on the U.S. refuse (column 1), the gross calorific value of the refuse on a dry basis is 3530 kcal/kg, but due to the higher food waste percent in the refuse everywhere else, it is at least 4000 kcal/kg.

The annual quantity of raw refuse per capita in the Unites States is 1600 lb (see Table 1–2 of "Principles and Practices of Incineration", by Richard C. Corey) or 2 kg per capita daily and the daily quantity of dry refuse per capita in the U.S. is 1.6 kg; whereas in other countries the quantity of raw refuse is generally less than 1.5 kg per capita and contains much more moisture than in the U.S. refuse.

The examples set forth below with reference to the described embodiments of the invention are based on a quantity of 0.5 kg of dry refuse per capita daily with a moisture content of 60% and a quantity of 1250 tons of raw refuse produced daily be a city population of 1 million persons.

According to FIG. 5 Embodiment of the invention a multi-purpose plant could be constructed for refuse disposal by incineration, power generation and fresh water production, for processing the refuse of a city population of 1 million persons (1250 tons of refuse containing 60% moisture, per day, assuming 0.5 kg dry refuse per capita daily), to produce 300,000 kWh power (see Table IV, item 12 below) and 20,000 cubic meters of fresh water per day (see Table V, item 16 below).

Now, with the U.S. refuse of a city population of 1 million persons (assuming 1.6 kg dry refuse per capita daily) it will be possible to produce approximately 900,000 kWh power and 60,000 cubic meters of fresh water per day or 15 MGD.

Remark: The processing of the refuse for oil and motor fuel production and for other purposes, requiring heat supply, will be considerably more economical if it is first dried according to the present method and apparatus.

The present drying method could be applied advantageously to all kinds of raw refuse, including that where the moisture content is even lower than that of the average United States refuse (20.7%). The advantages are: 1) The steam obtained by the vaporization of the moisture could be utilized, after being superheated, to produce by its expansion all the power required (40 to 45 kWh per ton of raw refuse) to operate the drier as well as the incinerator, including the power (15 to 20 kWh per ton of refuse) required for the preparation of the refuse for drying and incineration by shredding, magnetic and other separation means, feeding the prepared refuse into the drier and conveying the solid matter through and from the drier; 2) the overall thermal efficiency of the dried refuse is increased compared to that of the raw refuse; and 3) the net available heat of the United States average "all refuse" containing 79.3% solids and a gross calorific value of 6203 Btu/lb (see Table 1–3, page 7 of the above reference) assuming an overall thermal efficiency of 65% is: 6203 × 0.65 = 4032 Btu/lb.

Now the net available heat of the U.S. "all refuse", containing 95% solids and assuming an overall thermal efficiency of 70% is:

$$4032 \times \frac{70}{65} \times \frac{95}{79.3} = 5202 \text{ Bt./lb.}$$

This means an increase of 29% of the net available heat obtained by the incinerator of the same weight of said dried all refuse compared to that of said all refuse.

COMPOSITION AND CALORIFIC VALUE OF SLUDGE CAKE

From the example 36-2, page 36-6, 7, 8, given in "Water and Wastewater Engineering", Volume 2, by Fair, Geyer and Okun (published by John Wiley & Sons, Inc., New York, 1968), it results that the quantity of dry solids in combined primary and excess activated sludge (fresh) is 84 grams per capita, containing 60 grams (71.4%) volatile, and 24 grams (28.6%) fixed matter.

This composition on the dry basis is approximately the same as that of the refuse of Column (1) above, and it will be assumed that the gross calorific value of this sludge on the dry basis is also 4,000 kcal/kg.

A sludge cake containing 60% moisture could be obtained by the known methods of heat treatment and filtration so that a daily quantity of 210 tons of filtered sludge cake is produced by a population of one million persons.

According to the present invention, the net available heat is 110 million kcal, and the net excess of power produced by the incineration of said quantity of filtered sludge cake is 50,000 kWh.

In contrast, the prior art as noted above not only does not produce any heat and power excess, but requires the supplying of auxiliary fuel.

DRAWBACKS OF THE PRIOR ART OF REFUSE AND SLUDGE CAKE DISPOSAL BY INCINERATION

As indicated earlier in the prior art processes, a refuse or sludge cake containing more than 60% moisture, not only does not produce any excess of heat and power, but requires in addition a substantial amount of auxiliary heat. In the case of a low moisture containing refuse such as the U.S. refuse (20.7% moisture content), the net available heat is 77% of the net available heat of the dried refuse containing 5% moisture, for the same weights.

Furthermore, take for example a multiple-hearth furnace for incinerating filter cake as described in the above reference, FIG. 36-8, page 36-23. The sludge cake is fed onto the topmost hearth, and is moved downwardly from hearth to hearth. The sludge cake loses moisture, ignites and burns (the highest temperature being 1700° F, which is sufficient for destroying odorous components). The exhaust gases at 1000° F are passed through a preheater or recuperator and heat the air blown into the furnace. Now instead of utilizing the heat of the combustion gases at 1700° F to produce steam, the bulk of the heat is utilized to supply the latent heat of vaporization of the moisture contained in the cake; this latent heat cannot be recuperated — it is a total heat loss.

With respect to FIG. 36-7 of the same reference, it is said on page 36-21: "the temperature of the drying gases is reduced from 1000° F or higher to about 225° F. Volatilized sludge-odors are destroyed by incineration at about 1250° F. Heat is conserved by countercurrent flow".

In other words, deodorized exhaust gases at 1000° F are cooled to 225° F by direct contact drying of the sludge, and then the moisture-containing, and the odor-containing, cooled gases are again deodorized by heating to 1250° F, first by exhaust gases at 1000° F in a counter-current indirect preheater, and then by mixing with the hottest furnace gases at 2500° F.

The prior art method of drying and incinerating the sludge cakes as well as the refuse includes three main drawbacks: (1) the temperature of 1600° F, which is considered to be sufficient for the complete destruction of odors, is not reached; (2) great volumes of gases are recycled; and (3) the bulk of the heat of combustion is utilized for drying without it being possible to recover the latent heat of vaporization of the moisture contained in the refuse as well as in the sludge cakes.

BRIEF SUMMARY OF THE PRESENT INVENTION

According to a broad aspect of the present invention, there is provided a method of using moisture-containing solids, such as domestic refuse and sludge cakes, to produce dried solid fuel and steam, wherein the moisture-containing solids are introduced into the top of a vertical vessel containing a heating zone at superatmospheric pressure. The vessel serving as a pressurized boiler, and the moisture-containing solids serving as the feed-water and moving downwardly therein. The method includes the further steps of introducing super heated steam into a lower part of the heating zone to flow upwardly in countercurrent direct contact with the down-moving moisture-containing solids; removing from the upper end of the heating zone a nearly saturated steam at a considerably lower temperature and at a slightly lower pressure, due to frictional losses than the temperature and pressure of said introduced superheated steam, said removed steam including the water vapor evaporated from the moisture-containing solids by the heat of cooling of said introduced superheated steam; reheating and slightly compressing a quantity of the removed steam equal to the quantity of the introduced superpheated steam and recycling same through the heating zone in countercurrent flow to the down-moving moisture-containing solids; removing the dried solid residue; and removing, at substantially the superatmospheric pressure of the heating zone, the remaining steam corresponding to the water evaporated from the moisture-containing solids. The latter removed steam may then be utilized as a source of energy supply to an external system, such as a power generating system or a heating system.

According to an important feature of the invention, the bulk of the moisture contained in the moisture-containing solids is vaporized in said heating zone, the partially dried residue leaving the heating zone being directed to move downwardly through a flashing zone maintained at lower pressure than the heating zone, additional moisture from the moisture-containing solids being vaporized by flashing.

According to another important feature, the heating zone comprises a plurality of elevationally displaced heating stages. The superheated steam is introduced into the pressurized heating zone at the bottom of the heating stage containing the wettest moisture-containing solids, excepting the overlying stage or stages.

According to another important feature of the invention, the coolest superheated steam, excepting that introduced into the said overlying heating stage or stages, is introduced at the bottom of the heating stage containing the driest moisture-containing solids.

According to another aspect of the invention, there is provided apparatus for drying moisture-containing solids comprising: a vertical pressurized drier having an inlet at the top for the moisture-containing solids, and an outlet at the bottom for the dried residue; a heater for producing superheated steam and for passing same upwardly through the drier in countercurrent direct contact with the down-moving moisture-containing solids; a steam outlet at the upper end of the drier for removing nearly saturated steam including the water vapor evaporated from the moisture-containing solids; means for compressing and reheating a quantity of the so-called steam equal to the quantity of the introduced superheated steam; means for recycling the so-compressed and reheated quantity of superheated steam through the heater in countercurrent direct contact to the down-moving moisture-containing solids; means for removing the dried residue from the bottom of the drier; and means for directing the remaining steam removed from the top of the drier for other use.

As will be shown below, the method and apparatus of the invention can be used for efficiently drying domestic refuse and sludge cake to a moisture content of 5% or even less, so that the dried residue can be incinerated with a relatively high boiler efficiency, and the discharged incinerator flue gas is completely deodorized, at a minimum cost of air pollution control equipment.

As will also be shown below, by the method and apparatus of the present invention the heat required for drying domestic refuse containing 60% moisture could be supplied by the heat of incineration of only one-half of the dried refuse obtained from the domestic refuse, and the superheated steam produced from the moisture by said drying could be used to generate more than twice the power required to operate the system. In addition, a dual-purpose plant for power generation and fresh water production by distillation could be advantageously combined with the refuse disposal plant.

BRIEF DESCRIPTION OF THE DRAWINGS

The invention is herein described, by way of example only, with reference to several preferred embodiments illustrated in the accompanying drawings, wherein:

FIGS. 1 and 1a, taken together, illustrate one form of apparatus constructed in accordance with the invention for drying domestic refuse and sludge cakes, in order to incinerate efficiently the dried solid fuel and to utilize the recovered heat of the incineration to supply all the heat requirement for the drying, the heat excess being used for power generation for sale. The steam produced by said drying is superheated and utilized to produce all the power requirements, and the excess is available for sale.

FIG. 1b is an enlarged sectional view along line A—A of FIG. 1;

FIG. 1c is an enlarged sectional view along line B—B of FIG. 1;

DETAILED DESCRIPTION OF THE PREFERRED EMBODIMENTS OF THE INVENTION

The invention is described with respect to several preferred embodiments illustrated in FIGS. 1–5. Each embodiment is accompanied by a table, Tables I–V respectively, setting forth one example of operation of the respective embodiment.

As indicated earlier, the examples set forth below with reference to the described embodiments of the invention are based on a quantity of 0.5 kg of dry refuse per capita daily with a moisture content of 60%, and a quantity of 1250 tons of raw refuse produced daily by a city population of one million persons.

THE FIG. 1 EMBODIMENT

Figure 1A:
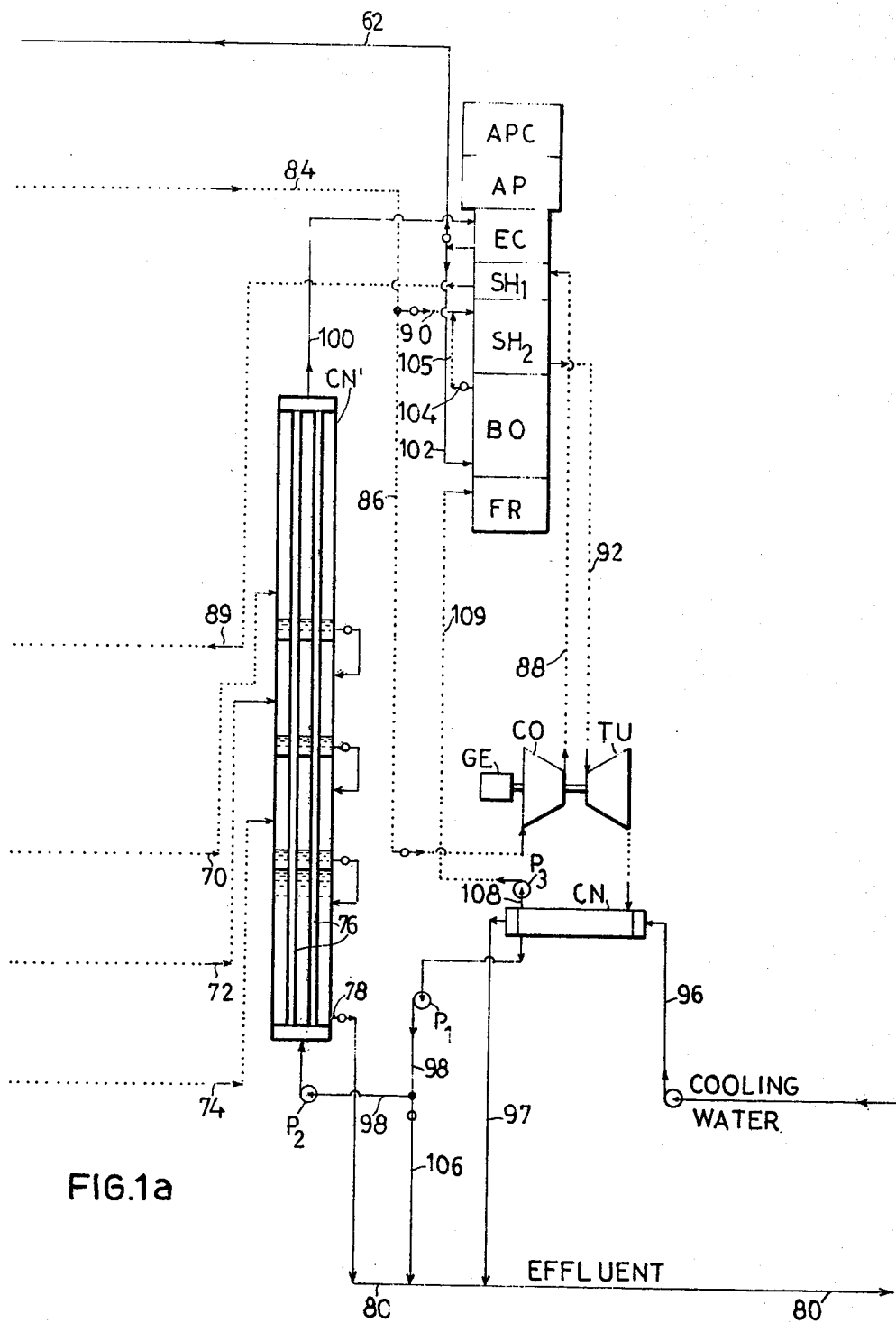

FIG. 1 (i.e., FIGS. 1 and 1a taken together) illustrates an apparatus for drying domestic refuse and sludge cake to produce dried solid fuel and steam. The latter product is superheated to generate all the power requirements to operate the drier and an excess of power is available for sale. The former product is incinerated and the recovered heat is utilized in part for supplying all the heat required for the drying and in part for power generation for sale.

The apparatus comprises a vertical pressurized drier, generally designated DR, having an inlet 4 at the top for the domestic refuse, sludge cake or other moisture-containing solids (hereinafter called "refuse"), and an outlet 6 at the bottom for the dried residue.

The refuse is fed to the pressurized drier DR by means of a horizontal conveyor 8 and an inclined conveyor 10, the latter elevating the refuse to a feeding unit, generally designated FD, which feeds it into the inlet 4 of the drier.

Any suitable feeder FD may be used for feeding the refuse from conveyor 10 into the inlet 4 of the pressurized drier DR. FIG. 1 illustrates one form of feeder that could be used.

The feeder illustrated in FIG. 1 comprises an inlet 14 which receives the refuse from conveyor 10 and directs it into a chamber 16 in which rotates a variable-pitch screw conveyor 18 for moving the refuse to the feeder outlet 20 communicating with the drier inlet 4. The pressure (e.g. 21 kg/cm$^2$) within the drier resists the feeding of the refuse by the variable-pitch screw 18. Therefore a portion of the wall defining chamber 16 is formed with openings as shown at 22, and a considerable portion of the water within the refuse passes as a liquid through openings 22 into a chamber 24 and is conveyed therethrough by a liquid pumping device, illustrated in FIG. 1 as a two-rotor screw pump 26. The separated liquid is thus conveyed to the outlet 28 of chamber 24, where it is reunited with the expressed refuse in outlet 20, before the two are introduced into the pressurized drier DR through its refuse inlet 4.

The vertical pressurized drier DR comprises an upper heating section, generally designated 30, in which superheated steam is introduced via a steam inlet 32; and a lower flashing section, generally designated 34, in which some of the water contained in the refuse is flashed and condensed in a condenser CN'. A vertical central shaft 37 drives the screw conveyor sections 38 conveying the refuse downwardly through the pressurized drier DR. The upper end of the drier includes conventional scrapers or knives 39 driven by a central shaft 40 for scraping away any solids clinging to the walls.

The heating section 30 of the pressurized drier is divided into a plurality of elevationally-decreased heating stages SD1, SD2, and SD3, the latter being the lowermost heating stage in the apparatus illustrated in FIG. 1.

Each heating stage is defined by a separator member SM1, SM2, SM3 which includes a tubular or slightly conical section 41. The diameters of the blades of the screw-conveyors 38 conform to the inner diameter of their respective sections 41. The upper ends of tubular sections 41 of the separator members are each joined to a funnel-shaped section 42, the diameter of which increases in the upwardly direction so that its upper edge is of the same diameter as the inner surface of the pressurized drier DR.

Each stage of the heating section 30 of the drier further includes a perforated member PM1, PM2, PM3 spaced above the separator member SM1, SM2, SM3 of the respective stage. Each perforated member comprises a tubular section 44 joined to an annular perforated plate 46. The tubular section 44 is of substantially the same diameter as the screwblade of the portion of the conveyor passing therethrough and through its upper perforated plate 46.

The heating steam is introduced through inlet 32 of the heating section 30 of the pressurized drier and passes upwardly through heating stage SD2 in countercurrent direct contact with the down-moving refuse. The refuse is positively fed downwardly by screw conveyors 38, particularly in cooperation with sections 41 and 44 of the members SM1–SM3 and PM1–PM3, respectively. The funnel sections 42 of the separator members SM1–SM3 funnel the down-moving sludge into the lower sections 41, where the refuse is compacted. This produces a barrier to the downward flow of the steam, and thereby forces the steam to flow upwardly through the perforated plates 46 of the respective members PM1–PM3.

As the steam, introduced through inlet 32 of the pressurized drier, passes upwardly in direct countercurrent contact with the down-moving refuse, some of the moisture within the refuse is vaporized. The steam leaving the heating stage SD2 of the pressurized drier exits through outlet 50, it being appreciated that the quantity of the steam so exiting is equal to that introduced into steam inlet 32 and that vaporized from the sludge in heating stage SD2.

The steam introduced into inlet 32 is superheated steam supplied from a superheater SH1. In the example of FIG. 1, as will be described more fully below, the steam at inlet 32 is superheated to a temperature of about 600° C, and a pressure of about 23 kg/cm². This superheated steam is introduced in the heating stage containing the wettest refuse excepting the overlying stage, wherein a significant part of the water within the refuse will have evaporated from it by the time it reaches the underlying heating stage. That is to say, the superheated steam is introduced into the lower end of an intermediate stage, this being stage SD2 of the FIG. 1 apparatus. More particularly, the steam is introduced into the space between the upper edge of the funnel section 42 of member SM2, and perforated plate 46 of member PM2.

The upper end of the second heating stage SD2 is defined by the lower surface of member SM1 of the overlying stage SD2. Just below member SM1 there is provided a steam outlet 50 conducting the steam via a pipe 52 to an inlet 54 at the lower end of the underlying heating stage, this being stage SD3. In addition, the upper end of heating stage SD3 is provided with an outlet 56 for directing steam via a pipe 58 to an inlet 60 at the lower end of the highest elevation heating stage SD1. From heating stage SD1, the steam passes through a demister DM to steam outlet 64, where it leaves the drier DR at a pressure of e.g. 21 kg/cm².

While FIG. 1 illustrates only three heating stages SD1–SD3, it will be appreciated that more heating stage could, and in most cases probably would, be used. When more heating stages are used, the arrangemenet illustrated in FIG. 1 is preferably extended to the other stages; i.e., in each heating stage below the intermediate one in which the superheated steam is first introduced, there are provided means for directing the superheated steam from the upper end of that stage to the lower end of the next underlying heating stage, and means for directing heated steam from the upper end of the lowest elevation stage to the lower end of the stage of next highest elevation than the intermediate stage. By this arrangement the coolest superheated steam, excepting that introduced into the stage overlying the intermediate stage, is introduced at the bottom of the heating stage containing the driest moisture-containing solids within the heating section 30.

FIG. 1 illustrates the arrangement where there is only one stage higher than the intermediate stage in which the superheated steam is first introduced, which is the preferred arrangement. However, if there are more than one heating stages higher than the one in which the superheated steam is first introduced, the same arrangement would be extended to them, i.e., the superheated steam would be directed from the upper end of each higher stage to the lower end of the immediately succeeding highest stage.

Demister DM is preferably one which is divided vertically into two sections DM1, DM2, with each of the sections being alternately, and at regulated intervals, sprayed or flooded with hot water flowing through pipe 62 from economizer EC by a 3-way valve 3-WV to: (1) aid is demisting the nearly saturated steam exiting from the pressurized drier through its steam outlet 64, and (2) clean the demister from clogging fine particles entrained by the steam flowing through the demister.

The superheated steam flowing upwardly through the highest elevation heating stage is partially condensed on the cold down-moving moisture-containing solids, introduced into the upper end of the drier. The results of this partial condensation are: (1) the introduced cold solids are heated to the saturation temperature of the unflowing steam, and (2) the upflowing superheated steam is scrubbed of the fine solid particles entrained therein by the down-moving moisture-containing solids additionally wet by the water condensate film formed on their surface.

The flashing section 34 of the pressurized drier also includes a plurality of elevationally displaced flashing stages FD1, FD2, FD3, each flashing stage being separated by a separator member FM1–FM3 of similar shape and construction as separator members SM1–SM3, excepting FM3 which includes at its bottom means for removing the dried refuse. The perforated members PM1–PM3, used in the heating section 30, however, are not used in the flashing section 34.

As the refuse moves downwardly through the flashing section 34 of the pressurized drier, being positively conveyed by conveyor sections 38, additional water is flashed from the refuse in the several flashing stages. The flashed water is directed through pipes 70, 72, 74, respectively, to condenser CN' where it is brought into indirect heat-exchange contact with a cooling liquid passing through pipes 76. The condensed water exits from the bottom of condenser CN' via outlet 78 and passes to an effluent and heat reject discharge line 80, where it is discharged.

The dried refuse (e.g., dried to a 5% moisture content), exits from the bottom outlet 6 of the pressurized drier to a discharging horizontal variable-pitch screw conveyor 82.

The steam leaving the pressurized drier through its outlet 64 and pipe 84 is equal in quantity to the superheated steam introduced into the drier through inlet 32, and the quantity vaporized from the refuse in the heating section 30. One example including quantities is set forth in Table I below.

The portion of the steam equal to the quantity introduced into inlet 32 is conveyed by pipe 86 to a compressor CO where it is compressed (e.g. from 21 kg/cm² to 23 kg/cm²), conveyed by pipe 88 to superheater SH1 where it is reheated (e.g., to 600° C), and then recycled back to the pressurized drier through pipe 89 and steam inlet 32.

The portion of the steam exiting from the pressurized drier equal to the quantity of steam produced by vaporization of the water from the refuse in the heating section 30 of the drier is directed from pipe 84 through pipe 90 to superheater SH2 where it is reheated. It is then introduced via pipe 92 into a turbine TU where it is expanded for producing mechanical power to drive the compressor 20. The bulk of the mechanical power is used for driving a generator GE which produces all the power requirement to operate the apparatus and an excess of water for sale.

The exhaust steam leaving turbine TU passes through a condenser CN where it is condensed by cooling water produced through inlet pipe 96 and exiting through pipe 97 into heat reject pipe 80. A portion of the condensed steam leaving condenser CN is pumped by pump P1 through pipe 98 and pump P2 to the bottom of condenser CN' and upwardly therethrough via pipes 76, where it is heated by the vapor exiting from the flashing section 34 of the pressurized drier and condensing in condenser CN'. The water so preheated exits from the upper end of the condenser and is directed via pipe 100 to an economizer EC, and from there through pipe 102 to the boiler 80. The steam vaporized in the boiler 80 flows through outlet 104 and connecting pipe 105 into pipe 90 and, together with the vaporized moisture from pipe 84, is introduced into superheater SH2, being heated there and flowing out through pipe 92 into turbine TU, the mechanical power being used for driving the generator GE producing power for sale.

Another portion of the condensed steam equal to the vaporized moisture in the heating section 30 flows through pipe 106 into the effluent and heat reject pipe 80.

Condenser CN includes an outlet pipe 108 connected to a vacuum pump P3, which draws air and other gases present in the steam, originating in the processed refuse or formed during said drying, and flowing from the pressurized drier through the superheater and turbine to the condenser CN. The gases so removed are fed through pipe 109 to furnace FR, thereby destroying any pollutants that may be entrained in the steam. In addition, the apparatus preferably includes an air-pollution control unit APC following the air preheater AP and the economizer EC.

The dried refuse exiting from the pressurized drier is of calorific value more than enough to supply the heat requirements for operating the system, thereby providing an excess of fuel which may be used for producing power for sale, while the steam produced from the moisture vaporization is, after being superheated, more than enough to supply the power requirements for operating the system, thereby producing an excess of power for sale.

For example, the following Table I sets forth some figures applicable to a daily quantity of refuse produced by one million persons, these figures being based on a quantity of 0.5 kg of dry refuse per capita daily having a moisture content of 60% as set forth above.

TABLE I

| | | |
|---|---|---|
| 1. | Refuse at 60% moisture content received in drier DR | 1,250 tons |
| 2. | Dried solid at 5% moisture content discharged from drier DR by conveyor 82 | 526 tons |
| 3. | Steam produced in heating section 30 (91% of the total moisture, 750 tons) | 683 tons |
| 4. | Moisture vaporized in flashing section 34 | 42 tons |
| 5. | Recycling superheated steam introduced into drier DR through inlet 32 | 2,463 tons |
| 6. | Maximum power required to operate the plant including the compression from 21 to 23 kg/cm² of the 2,463 tons of recycling superheated steam, and refuse shredding, (50 kWh × 1,250 tons) | 62,500 kWh |
| 7. | Steam at 21 kg/cm² and 600°C to produce said maximum power required (at 230 kWh/ton steam - see remark 1) | 272 tons |
| 8. | Available steam at 21 kg/cm² and 220°C obtained from the moisture drying (683−272) | 411 tons |
| 9. | Total net available heat obtained by the incineration of 526 tons of dried refuse at 5% moisture content (526 × 1000 × 0.95 × 4000 × 0.65 kcal) (or 1300 × 10⁶ × 3.968 = 5160 million Btu) or | 1,300 million kcal. |
| | less heat supplied to superheater SH1 to heat 2,463 tons steam from 230.5° to 600°C at 23 kg/cm² | 501 million kcal. |
| | less heat supplied to superheater SH2 to heat 272 tons steam from 220° to 600°C at 21 kg/cm² | 57 million kcal. |
| | less heat supplied to superheater SH2 to heat 411 tons steam from 220° to 600°C | |

TABLE I-continued

|  |  |  |
|---|---|---|
|  | at 21 kg/cm² | 85 million kcal. |
|  | Total net available heat | 656 million kcal. |
| 10. | The steam produced at 21 kg/cm² and 600°C by said 656 million kcal supplied to boiler BO and superheater SH2 $(656 \times 10^6/(881.2 - 218.6) \times 10^3)$ (it is assumed that the feed water flowing from the economizer into the boiler is at the saturation temperature (213.85°C) | 990 tons |
| 11. | Total available steam at 21 kg/cm² and 600°C obtained from the moisture (item 8) and from the boiler BO and superheater SH2 (item 10) | 1,401 tons |
| 12. | Available power produced in turbine TU from the total available steam (1400 × 230 kWh/ton) According to the FIGS. 1 and 1a embodiment of the present invention, there are obtained: 320,000/500 = 640 kWh/ton dry refuse or 320,000/1250 = 256 kWh/ton of raw refuse at 60% moisture content. | 322,000 kWh |
| 13. | Total condensed steam at 0.4 kg/cm² and 75.5°C (990 + 683) | 1,673 tons |
| 14. | Total heat of condensation per day (1673 × 1000 × 554.1) | 927 million kcal. |

REMARKS:

1. The power produced (230 kWh/ton steam) is due to the expansion of the steam at 21 kg/cm² and 600° C to 0.4 kg/cm² and 75.4° C, assuming 80% turbine efficiency of the isentropic work of expansion (the entropies at 21 kg/cm² and 600° C, and at 0.4 kg/cm² and the saturation temperature 75.42° C, being approximately equal - 1,836 and 1,833 respectively).
2. The heat of condensation of this vapor (554, 1 kcal/kg) could be utilized in a multi-effect distillation system for water desalination requiring a saturation heating steam at 75.5° C (see paper by A. Pachter, A. Barak and J. Weinberg presented at the symposium on "Developments in Desalination Technology in Israel" March 1971, published by the "National Council for Research and Development" Prime Minister's Office, Jerusalem).

For a performance ratio of 9lb/1000Btu or 62,00 kcal/m³ desalined water, 1 ton of steam condensed at 75.5° C corresponds to the production of 554. 100/62.000 = 9 m³ of desalined water and the daily production from 1673 tons steam (items 3 and 10) is: 1673 T × 9 m³ = 15,060 m³.

In this case, condenser CN is either a part of the first effect of a multi-effect evaporator, or the heater in a multistage flash evaporation plant, and the system is operated as a dual-purpose plant for power generation and fresh water production by distillation (see FIG. 3 Embodiment and Table III below).

3. Further expansion of the steam by lower temperature condensation will of course produce more power per ton of refuse.
4. In the examples of Table I (and in Tables II–V below), the maximum steam temperature is 600° C and the pressures of the introduced superheated steam and of the removed nearly saturated steam are 23 and 21 kg/cm², respectively.

Now take another example where 550° C is the maximum steam temperature and 20 and 18 kg/cm² respectively and the pressures of the introduced and removed steam. In this case the pressure and temperature of the turbine exhaust steam is 0.46 kg/cm² and 79° C respectively for isentropic expansion (the entropies at 18 kg/cm² and 550° C and at 0.46 kg/cm² and at the saturation temperature 79° C, being approximately equal - 1,8220 and 1,8213 respectively).

In these conditions the following results are obtained: at 80% turbine efficiency the power produced is 210 kWh/ton steam; the quantity of the recycling superheated steam is 2760 tons; the steam needed to produce all the power requirements to operate the system is 360 tons; the total net available power is 289,000 kcal, and the total turbine exhaust steam condensed at 0.46 kg/cm² and 79° C is 1735 tons.

THE FIG. 2 EMBODIMENT

Figure 2:
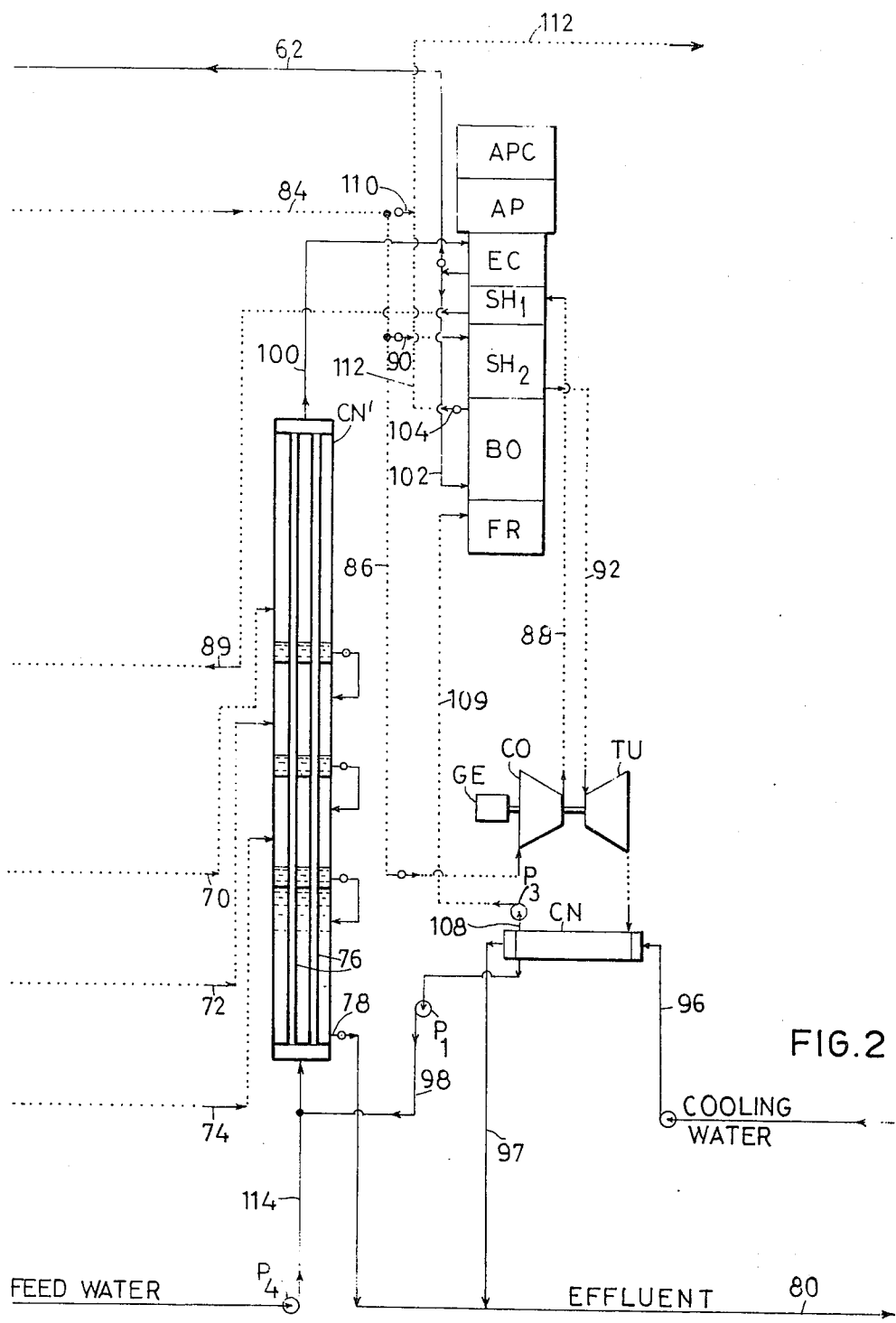
FIG. 2 illustrates the portion of the apparatus similar to that of FIG. 1a, but modified to produce steam (at about 220° C) for heating purposes, instead of power, from the recovered heat if incineration and from a portion of the vaporized moisture.

The FIG. 2 (i.e., FIGS. 1 and 2 taken together) Embodiment is similar to that of FIG. 1 except that instead of using the excess steam (i.e., that produced by vaporizing the moisture contained in the refuse in the pressurized drier DR) for producing power for sale, this excess steam is used for producing steam (at a temperature of 220° C) for sale for heating purposes.

The apparatus of FIG. 2 Embodiment is therefore the same as FIG. 1 Embodiment (similar reference numbers being used for the same parts) except that some of the steam flowing out of the pressurized drier DR through pipe 84 is diverted by pipe 110 to outlet pipe 112 for sale for heating purposes. In addition, steam outlet pipe 112 is connected to outlet 104 and also receives the steam from boiler 80 also for sale for heating purposes.

Another difference is that pipes 105 and 106 are eliminated and a pipe 114 and a pump P4 for feed water are added. In this embodiment the said excess steam and the steam produced in the boiler from the feed water are evacuated from the system as heating steam for sale.

Table II below sets forth one example of the operation of FIG. 2 system to produce steam for heating purposes, these figures being based on the same refuse production of one million persons per day as that of Table I.

Table II

|  |  |  |
|---|---|---|
|  | Items 1 to 8 are the same as in Table I. | |
| 9. | Steam at 21 kg/cm² and 220°C produced for heating | |
|  | a) from moisture (item 8) | 411 tons |

Table II-continued

|     |     |     |
| --- | --- | --- |
|     | b) from item 9 of Table I we obtain: steam at 21 kg/cm² and 220°C produced in the boiler 80 is: $(1300-501-57) \times 10^6$ kcal/$(673-218.6) \times 10^3 =$ | 1,633 tons |
|     | Total steam for heating | 2,044 tons |
| 10. | Steam produced by dried refuse at 5% moisture content or by dry refuse are respectively: 2044/526 = 3.89 kg steam/kg dried refuse and 2044/500 = 4.09 kg steam/kg dry refuse. | |

THE FIG. 3 EMBODIMENT

Figure 3:
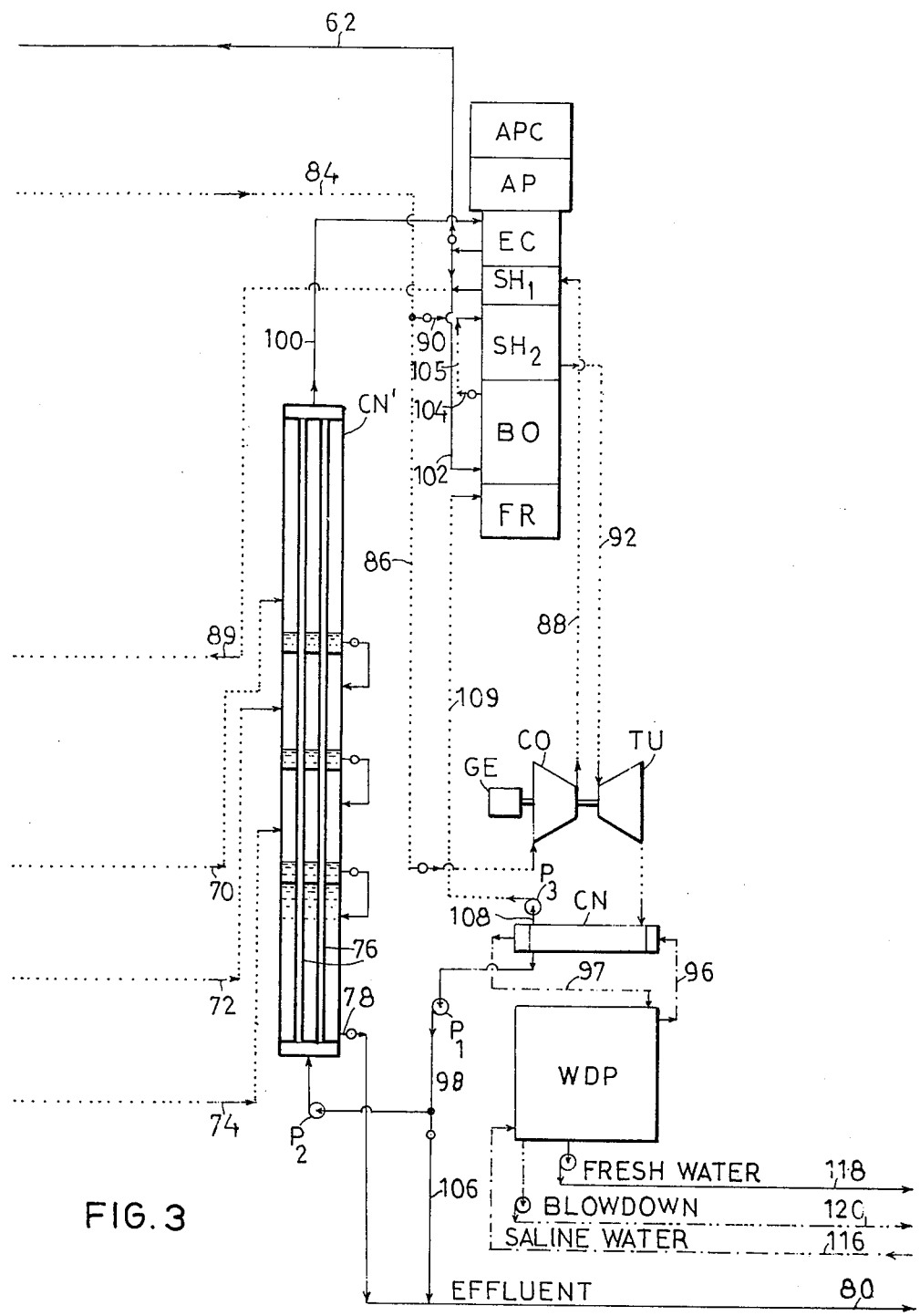
FIG. 3 illustrates the portion of the apparatus similar to that of FIG. 1a, but modified for power generation, combined with fresh water production by low-pressure distillation in a dual-purpose plant.

The FIG. 3 (i.e., FIGS. 1 and 3 taken together) Embodiment is similar to that of FIG. 1 except that the heat of condensation of the exhaust steam from the turbine, instead of being lost to the cooling water as a heat reject, is utilized to supply the heat requirements of a multiple-effect or a multi-stage distillation plant for fresh water production. Thus, this Embodiment is particularly useful as a dual-purpose plant for power generation and fresh water production by distillation.

The apparatus of FIG. 3 Embodiment is the same as in FIG. 1 Embodiment (similar reference numbers therefore being used for the same parts) except that condenser CN is utilized as the heater in a multi-stage plant, or as a part of the hottest effect of a multiple-effect plant (a water distillation plant WDP) to produce fresh water from saline water or from polluted water, operated at a relatively low top temperature of 75.5° C and at a relatively low top pressure of 0.4 kg/cm² for instance. The saline or polluted water is fed into the plant via pipe 116. The fresh water leaves the plant via pipe 118, and the blowdown leaves the plant via pipe 120. The saline or polluted water, after being heated in the WDP, flows through pipe 96 into the condenser CN and flows out therefrom at a higher temperature through pipe 108 back into the WDP and finally through the heat reject pipes 118 and 120.

Table III sets forth one example of the operation of the dual-purpose power and fresh water production plant illustrated in FIG. 3 system.

Table III

|     |     |     |
| --- | --- | --- |
|     | Items 1 to 14 are the same as in Table I. | |
| 15. | The daily quantity of fresh water produced by the fresh water distillation plant WDP utilizing the heat of condensation in the condenser-heater CN (see also Remark 2) of Table I) is:$(927 \times 10^6$ kcal/62,000 kcal) | 15,000 m³ |

FIG. 4 EMBODIMENT

Figure 4:
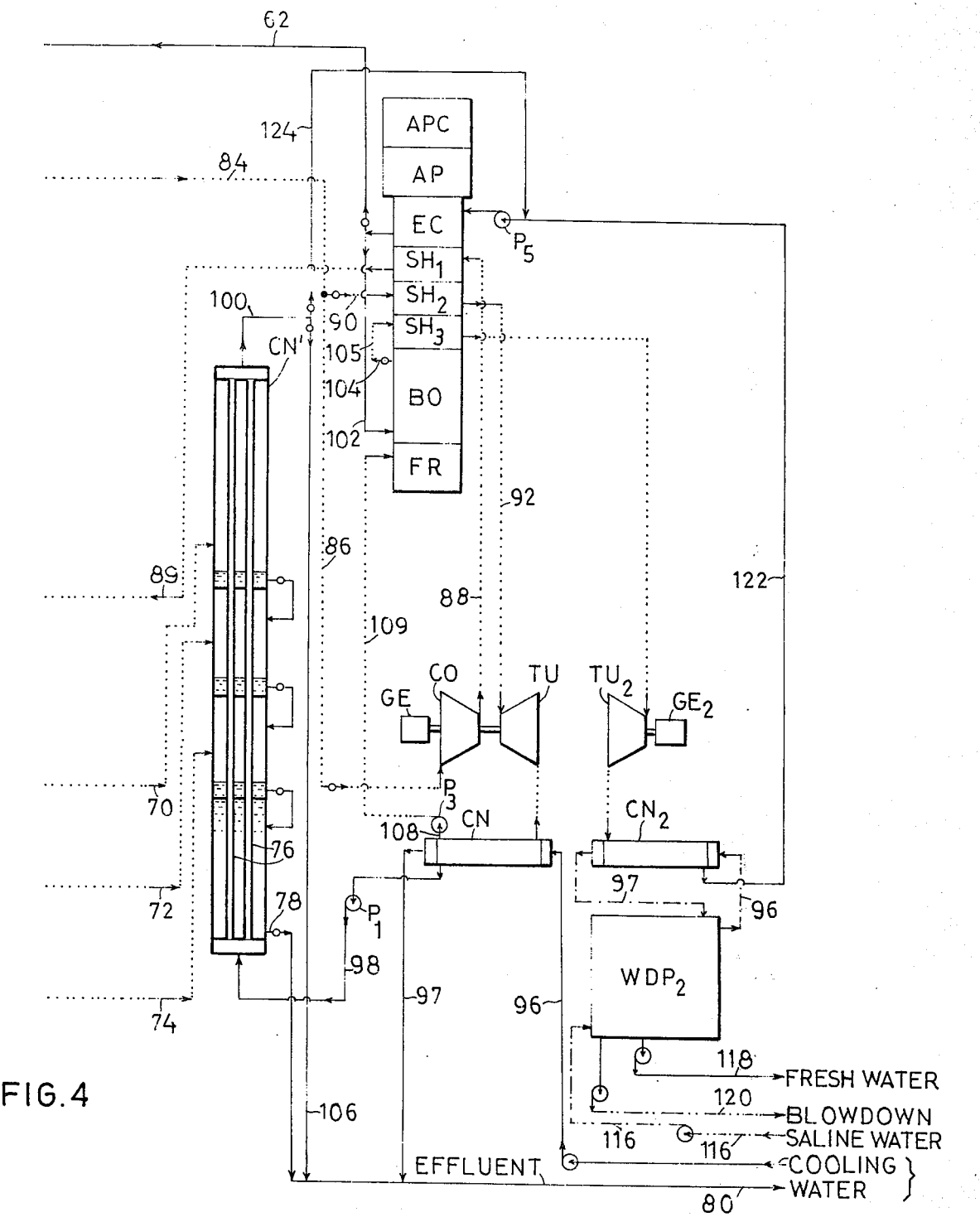
FIG. 4 illustrates the portion of the apparatus similar to that of FIG. 3, but modified to produce steam at high pressure for use in high-pressure distillation.

The FIG. 4 (i.e., FIGS. 1 and 4 taken together) Embodiment is similar to that of FIG. 1 except that the steam produced in the boiler is used for producing steam at high pressure and the exhaust steam of a high pressure turbine is used for a high temperature water production plant. The apparatus of FIG. 4 is therefore the same as that of FIG. 1 Embodiment (similar reference numbers also being used for the same parts) except that it includes a third superheater SH3 and a second turbine TU2 supplied with high pressure steam by superheater SH3; the turbine TU2 driving a second generator GE2, and a second condenser CN2 which condenses the exhaust steam exiting from turbine TU2 at a relatively high temperature 130.5° C and pressure 2.8 kg/cm² for instance. The heat of condensation of the steam condensing in condenser CN2 is used for heating the water in a fresh water distillation plant WDP2. The condensate from the second condenser CN2 flows through pipe 122 and pump P5 into the economizer and a portion of the heated water flowing out from condenser CN' through pipe 100, flows through pipe 124 into pipe 122 and finally into the economizer EC.

Table IV below sets forth one example of the operation of the FIG. 4 system.

Table IV

|     |     |     |
| --- | --- | --- |
|     | Items 1 to 8 are the same as in Table I. | |
| 9.  | In superheater SH3 steam is produced at 81 kg/cm² and 600°C by 653 million kcal see item 9 of Table I) supplied to boiler BO and superheater SH3. It is assumed that the feed water flowing from the economizer into the boiler is at the same enthalpy (218.6) as in item 10 of Table I. As the enthalpy at 81 kg/cm² and 600°C is 869.7 kcal/kg, the daily produced steam is: $(653 \times 10^6$ kcal/$(869.7 - 218.6)$ | 1,000 tons |
| 10. | The steam expands isentropically in turbine TU2 from 81 kg/cm² and 600°C to 2.8 kg/cm² and 130.5°C (vapor enthalpy = 650.0 kcal/kg). The daily net power produced by turbine TU2 at 80% turbine efficiency: $(10^6 \times (869.7-650.0) \times 1.163 \times 10^{-3} \times 0.80) =$ | 204,400 kWh |
| 11. | The daily net available power obtained from the expansion of 410 tons steam from 21 kg/cm² and 600°C (see items 8 and 9 and Remark 1 of Table I) to 0.40 kg/cm² and 75.5°C: (410 tons × 230 kWh/ton) | 94,300 kWh |
| 12. | The daily total net power produced in turbine TU and turbine TU2 (204,400 + 94,300) | 298,700 kWh |

Table IV-continued

| | | |
|---|---|---|
| | This is compared to 320,000 kWh/day according to FIG. 1 Embodiment (see item 12 of Table I) | |
| 13. | The heat of condensation per day in heater-condenser CN2 at 2.8 kg/cm² and 130.5°C: ($10^6 \times 518.9$) | 519 million kcal |
| | Remark: In a desalination plant operated at a top temperature of 250°F (121°C), a performance ratio of 15 lb/1000 Btu or 37,000 kcal/1000 kg of fresh water produced could be assumed. | |
| 14. | The daily production of fresh water ($519 \times 10^6$ kcal/37,000) This is compared to 15,000 m³ according to FIG. 3 Embodiment (see item 15 of Table III) | 14,000 m³ |

THE FIG. 5 EMBODIMENT

Figure 5:
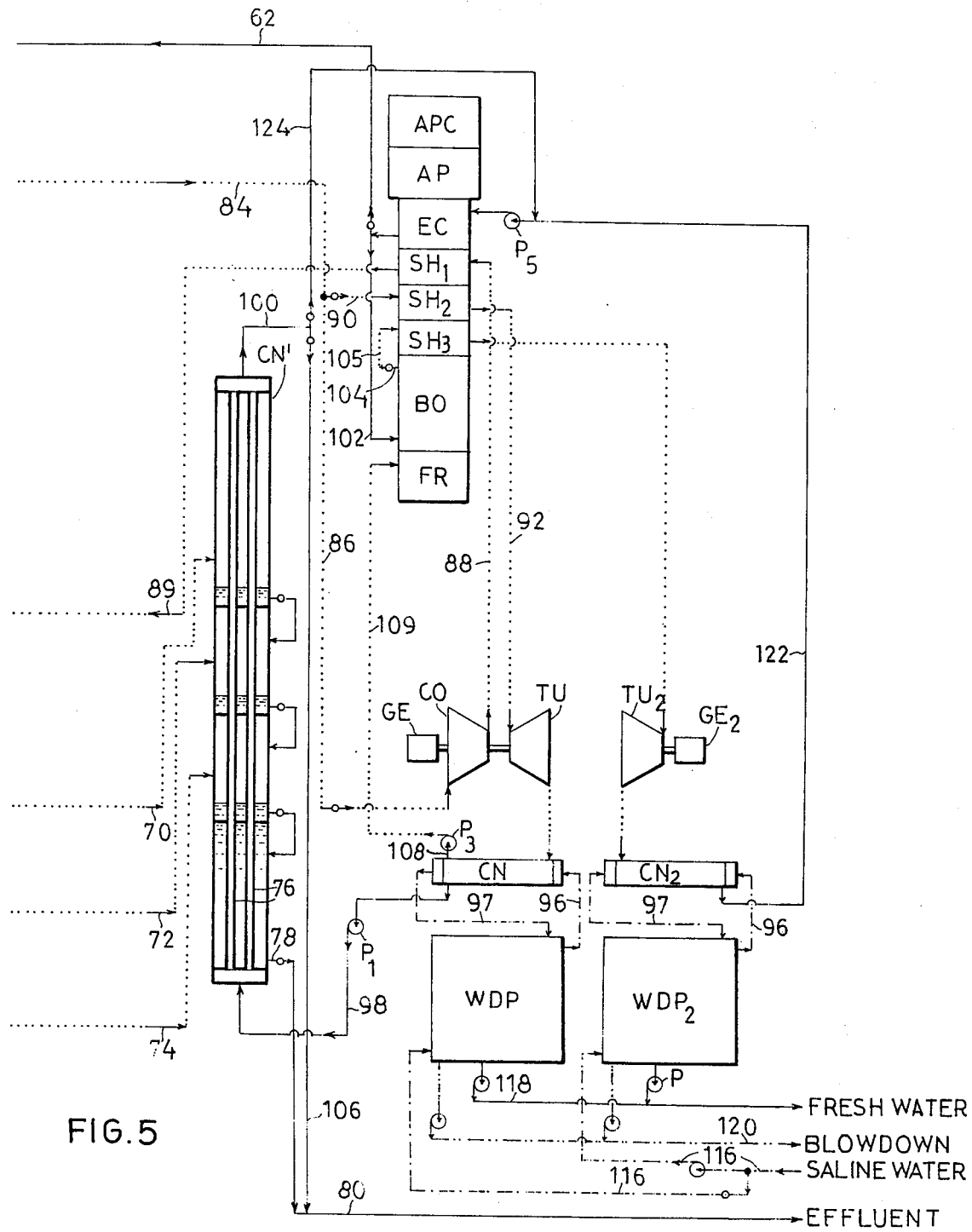
FIG. 5 illustrates a portion of the apparatus similar to that of FIG. 4, but modified to produce both high-pressure steam for high-pressure distillation and medium-pressure steam for low-pressure distillation.

The FIG. 5 (i.e., FIGS. 1 and 5 taken together) Embodiment is similar to that of FIG. 4 except that the steam produced by vaporizing the moisture contained in the refuse in section 30 of the pressurized drier and the steam produced in the boiler are respectively used for operating two water production plants: a low-temperature distillation plant WDP corresponding to the similarly identified plant in FIG. 3 and a high-temperature distillation plant WDP2 corresponding to the similarly identified plant in FIG. 4.

Table V sets forth one example of the operation of the FIG. 5 system.

Table V

| | | |
|---|---|---|
| | Items 1 to 14 are the same as in Table IV. | |
| 15. | The heat of condensation of the vaporized moisture (item 3 of Table I) in condenser-heater CN at 0.4 kg/cm² and 75.5°C ($683 \times 1000 \times 554.1$) | 378.5 million kcal |
| 16. | Total daily fresh water produced: | |
| | a) in distillation plant WDP (item 15 above) ($378.5 \times 10^6$/62,000) | 6,100 m³ |
| | b) in distillation plant WDP2 (item 14, Table IV) | 14,000 m³ |
| Total | 20,100 | m³ |

Many other variations, modifications and applications of the illustrated Embodiments will be apparent.

What is claimed is:

1. A method of using moisture-containing solids, such as domestic refuse and sludge cakes, to produce dried residue and nearly saturated steam at super atmospheric pressure, comprising: introducing the moisture containing solids into the top of a vertical vessel containing a heating zone at super-atmospheric pressure, the vessel serving as a direct contact pressurized boiler and the moisture-containing solids serving as the feedwater and flowing downwardly therein: introducing superheated steam into a lower part of the heating zone to flow upwardly in counter-current direct contact with the down-moving moisture-containing solids, the bulk of the moisture contained in the moisture-containing solids being vaporized in said heating zone; removing from the upper end of the heating zone a nearly saturated steam at a considerably lower temperature and at a slightly lower pressure than the temperature and pressure of said introduced superheated steam, said removed steam including the water vapor evaporated from the moisture-containing solids by the heat of cooling of said introduced superheated steam; reheating and slightly compressing a quantity of the removed steam equal to the quantity of the introduced superheated steam and recycling same through the heating zone in counter-current flow to the downmoving moisture-containing solids; directing the partially dried residue leaving the heating zone to move downwardly through a flashing zone maintained at lower pressure than the heating zone, additional moisture from the moisture-containing solids being vaporized by flashing; removing the dried solid residue; and directing, at substantially the super-atmospheric pressure of the heating zone, the remaining portion of the removed steam corresponding to the water evaporated from the moisture-containing solids for use as a source of energy.

2. A method according to claim 1, wherein said heating zone comprises a plurality of elevationally displaced heating stages.

3. The method according to claim 2, wherein the superheated steam is introduced into the lower end of an intermediate-elevation stage of the heating zone, the superheated steam being thereafter directed from the upper end of that stage to the lower end of the next underlying stage, and in a similar manner through the successively underlying stages to the lower end of the lowest elevation stage, the superheated steam being thenceforth directed from the upper end of the lowest elevation stage to the lower end of the stage of next higher elevation than said intermediate stage.

4. A method according to claim 3, wherein said next higher stage is the only heating stage of higher elevation than said intermediate stage, the cooled nearly saturated steam at super-atmospheric pressure being removed from said heating zone through the upper end of said next higher elevation stage.

5. The method according to claim 3, wherein there are a plurality of heating stages higher than said intermediate stage, the superheated steam being directed from the the upper end of said next higher stage to the lower end of the immediately succeeding higher elevation stage, and in the same manner through all said plurality of higher stages, the cooled nearly saturated steam at super-atmospheric pressure being removed from said heating zone through the upper end of the highest elevation heating stage.

6. The method according to claim 2, wherein the steam flowing upwardly through the highest elevation heating stage is scrubbed of any fine solid particles entrained therein by the moisture-containing solids introduced into the upper end of the drier and by the water condensed from a portion of said upwardly flowing steam on the introduced and downwardly moving solids.

7. The method according to claim 1, further including the steps of passing the steam exiting from the heating zone through a demister, the demister being divided vertically into at least two sections, each of the sections being alternately sprayed or flooded at predetermined time intervals with water to aid it in demisting the exiting nearly saturated steam and to maintain the demister clean from clogging by fine solid particles entrained in the steam passing through the demister.

8. The method according to claim 1, wherein said flashing zone comprises a plurality of elevationally-displaced flashing stages of decreasing pressure, the lowermost flashing stage being approximately at atmospheric pressure.

9. The method according to claim 1, wherein all or a portion of the vaporized moisture in said heating zone is heated to a high temperature and then directed to a turbine to generate all the power required to operate the apparatus including the compression and recirculation of said quantity of recirculated superheated steam.

10. The method according to claim 9, wherein the vapor exiting from the turbine is condensed and gases are removed therefrom and are directed to a furnace for burning.

11. A method according to claim 1, wherein a portion of the dried residue is incinerated for reheating said quantity of recycled superheated steam.

12. A method according to claim 1, wherein all the dried residue is incinerated and the heat produced is utilized for three main purposes: one portion for heating vaporized moisture which is directed to a turbine for producing power; a second portion for reheating the recirculated superheated steam; and the remaining third portion for producing saturated steam in a boiler for heating, or for the production of superheated steam in a boiler and a superheater for power production in a turbine.

13. Apparatus for using moisture-containing solids to produce residue and nearly saturated at super-atmospheric pressure steam comprising: a vertical pressurized drier having an inlet at the top for the moisture containing solids, and an outlet at the bottom for the dried residue, said drier including an upper heating zone and a lower flashing zone; means for introducing super-heated steam and for passing same upwardly through the heating zone of the drier in counter-current direct contact with the downmoving moisture-containing solids; a steam outlet at the upper end of the drier for removing nearly saturated steam at super-atmospheric pressure including the water vapor evaporated from the moisture-containing solids; means for compressing and reheating a quantity of the so-removed steam equal to the quantity of the introduced superheated steam; means for recycling the so-compressed and reheated quantity of superheated steam through the heating zone in countercurrent direct contact to the down-moving moisture-contained solids; means for directing the remaining portion of the steam corresponding to the water evaporated from the moisture-containing solids in said heating zone for use as a source of energy; means for feeding the moisture-containing solids into the top of the drier against the super-atmospheric pressure therein; means for removing the dried residue from the bottom of the drier; said upper heating zone including at least one heating stage, and said lower flashing zone including at least one flashing stage having a water vapor outlet at its top for removing the flashed water vapor; means for transferring the dried residue from the lower end of the heating zone to said flashing zone; and means for removing the further dried residue from the lower end of the flashing zone.

14. Apparatus according to claim 3, wherein the drier includes a plurality of elevationally-decreasing heating stages at the upper part, and a plurality of flashing stages of decreasing pressure at the lower part, each of said flashing stages including a water vapor outlet for removing the flashed water vapor; means for transferring from stage to stage the partially dried moisture-containing solids, and for removing the dried residue from the bottom of the drier.

15. Apparatus according to claim 14, further including means for introducing the superheated steam into the lower end of an intermediate elevation heating stage, means for directing the superheated steam from the upper end of that stage to the lower end of the next underlying heating stage, are in the same manner through the successively underlying stages to the lowest elevation stage, and means for directing the superheated steam from the upper end of the lowest elevation stage to the lower end of the stage of next highest elevation than said intermediate stage.

16. Apparatus according to claim 15, wherein said next highest heating stage is the only heating stage of higher elevation than said intermediate stage, the cooled nearly saturated steam at super-atmospheric pressure being removed from said heating zone through the upper end of said next higher elevation stage.

17. Apparatus according to claim 15, wherein there are a plurality of heating stages higher than said intermediate heating stage, the superheated steam being directed from the upper end of said next higher heating stage to the lower end of the immediately succeeding higher elevation heating stage, and in the same manner through all said plurality of higher stages, the cooled nearly saturated steam at superatmospheric pressure being removed from said heating zone through the upper end of the highest elevation heating stage.

18. Apparatus according to claim 13, wherein said transferring and removing means comprises screw conveyors extending throught the lower part of each one of the flashing stages and at least one of the heating stages, and wherein each heating stage includes at its lower part a perforated separator plate having a central opening with a downwardly extending tubular section, each of the flashing stages and at least one of the heating stages further including a funnel-shaped barrier member having a central downwardly extending conical-shaped tubular section at its lowest part through which a screw conveyor passes, said funnel-shaped section being joined to the inner walls of the drier, the moisture-containing solids fed by the screw conveyor from any one stage to the next underlying stage being compacted by the screw conveyor between it and said tubular conical section and forming a barrier to the down-flow of the steam to the underlying heating or flashing stage and thereby forcing same to flow upwardly through the perforations of the perforated plate to the overlying heating stage, or forming a barrier to the up-flow of the steam from said intermediate stage to the lower steam pressure overlying heating stage and thereby forcing the steam to flow-out at the top of said intermediate stage to the lower part of the underlying stage.

19. Apparatus according to claim 18, wherein the drier includes at least two heating stages and one flashing stage, and the moisture-containing solids removed from the lower part of the first heating stage being sufficiently dried to enable its transfer to the underlying heating stage against the higher steam pressure therein by means of the screw conveyor passing through said conical-shaped tubular section.

20. Apparatus according to claim 18, wherein the tubular extension from said funnel-shaped barrier member is of cylindrical shape and the screw passing therethrough is a variable-pitch screw to pack the dried residue into a dense mass thereby forming a seal for the steam between each pair of the drying and flashing stages.

21. Apparatus for drying moisture-containing solids to produce a dried residue; comprising: a vertical pressurized drier having an inlet at the top for the moisture-containing solids, and an outlet at the bottom for the dried residue; means for feeding the moisture-containing solids into the pressurized drier; a steam inlet at a lower part of the drier for introducing superheated steam into a space comprised between a lower funnel having a central downwardly extending tubular section for the dried residue, and an upper horizontal perforated plate having a central opening with a downwardly extending tubular section; a screw conveyor passing through both said tubular sections; the moisture-containing solids being compacted between the screw conveyor and its respective funnel tubular section and thereby forming a barrier for the flow of steam through the screw conveyor forcing same to flow upwardly through the perforations of said perforated plate and in countercurrent direct contact with the down-moving moisture-containing solids; a steam outlet at the upper end of the drier for removing the nearly saturated steam including the water vapor evaporated from the moisture-containing solids; means for compressing and reheating a quantity of the so-removed nearly saturated steam equal to the quantity of the introduced superheated steam; means for recycling the compressed and reheated portion of superheated steam through the drier in countercurrent direct contact with the down-moving moisture-containing solids; means for removing the dried residue from the bottom of the drier; and means for diverting the excess of steam removed from the top of the drier for power generation or other uses.

22. Apparatus according to claim 21 further comprising a combined screw press, screw feeder and screw pump; the screw press expressing a portion of the moisture as a liquid through a screen; the feeder driving the partially expressed residue into the pressurized drier; and the screw pump receiving said expressed liquid and driving same into the pressurized drier.

23. Apparatus according to any one of claim 13, further including a demister at the steam outlet end of the drier, said demister being divided vertically into at least two sections, and means for spraying or flooding each section alternately with water at predetermined time intervals.

* * * * *